July 21, 1959 M. E. HOFF, JR 2,896,126
LIGHTNING PROTECTION FOR AN ELECTRONIC TRACK CIRCUIT
Filed Sept. 4, 1956
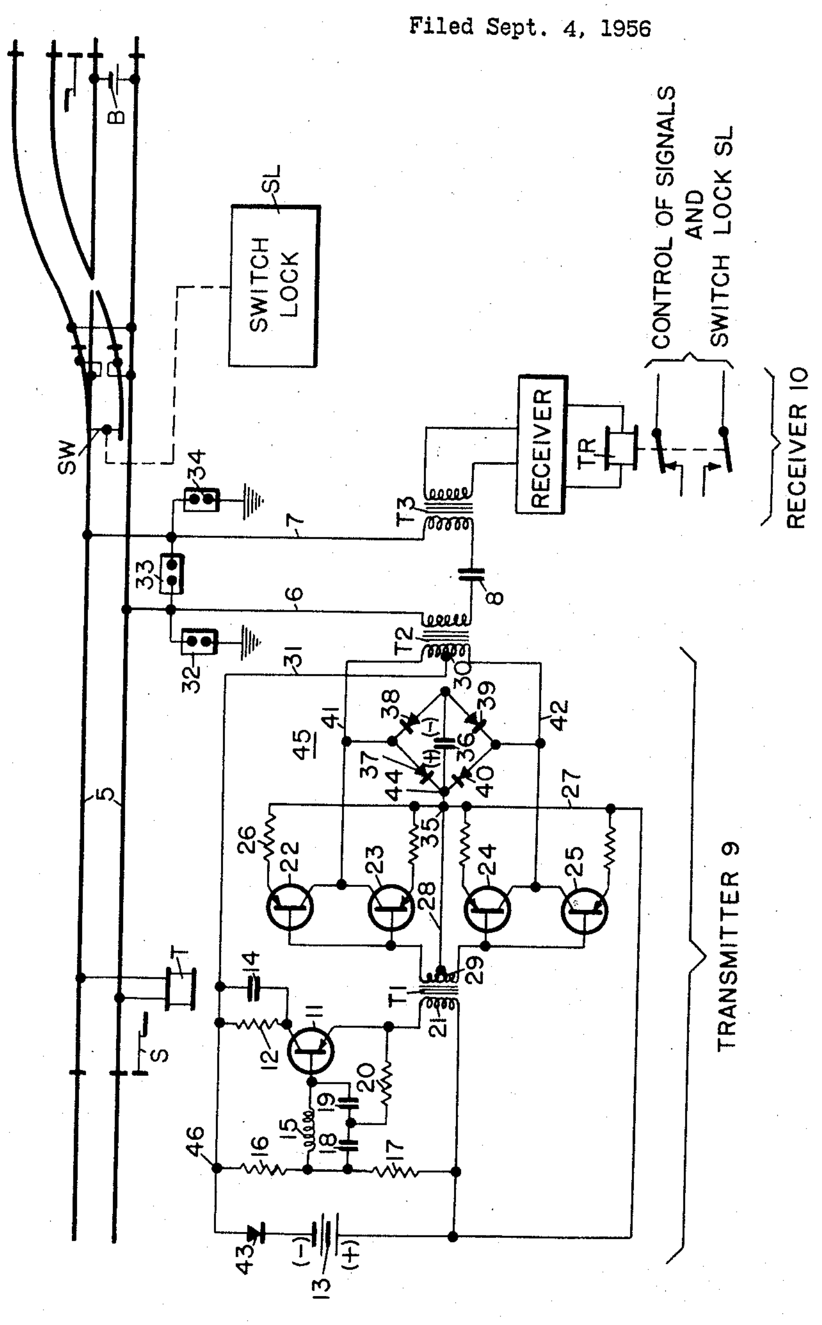
INVENTOR.
M.E. HOFF JR.
BY Forest B. Hitchcock
HIS ATTORNEY 2,896,126
Patented July 21, 1959

2,896,126

LIGHTNING PROTECTION FOR AN ELECTRONIC TRACK CIRCUIT

Marcian E. Hoff, Jr., Spencerport, N.Y., assignor to General Railway Signal Company, Rochester, N.Y.

Application September 4, 1956, Serial No. 607,842
7 Claims. (Cl. 317—9)

This invention relates to an organization for protecting electronic apparatus from static discharges, external voltage surges, and lightning, and more particularly pertains to the provision of means for protecting transistors employed in an electronic track circuit for railroads.

It has been previously proposed to superimpose a relatively high frequency electronic circuit upon a conventional direct current track circuit. Such a superimposed electronic track circuit is particularly useful in providing for the detection of trains over a relatively limited portion of the entire direct current track circuit without the necessity of using separate insulated track joints and related apparatus.

However, such electronic devices, particularly transistors, which are employed in the electronic track circuit are found to be particularly vulnerable to excessive discharges caused by lightning, even though conventional lightning protection apparatus is employed.

In view of the above, it is the purpose of the present invention to provide protection for transistors, or other electronic devices employed in electronic track circuits; and the present invention proposes to accomplish this by means which are suitable to protect such apparatus from any static surges which would raise the applied potential above a normal operating voltage, for example, twenty volts.

Since conventional lightning arrestors are capable of breaking down and allowing static discharges to equalize or pass to ground at minimum potentials of approximately 100 volts, for example; it becomes apparent that the present invention must provide protection for low voltage electronic devices which will break down or become destroyed by potentials of insufficient value to be handled by the conventional means. It has been found that transistors will break-down or become damaged from voltage surges at potentials as low as fifty volts even though such transistors are designed to normally operate on potentials in the order of twenty volts.

Generally speaking, and without making any attempt to define the exact nature of the invention, it is proposed to provide a protective organization, employing elements which are so connected to the transistorized electronic apparatus as to absorb and gradually dissipate any current that is created by potentials in excess of the normal operating potential. Such organization will absorb the external abnormal potentials and thereby cause the electronic devices, including transistors, to have longer life due to their relief from relatively minor strains, which strains would not in themselves break-down or damage the electronic apparatus.

It is to be understood that this invention is supplemented by lightning arrestors to protect the electronic apparatus from abnormally high potentials rising above these relatively low potentials which are absorbed by the organization of the present invention.

The object of the present invention is to protect low voltage electronic devices from lightning disturbances or other transient voltage surges by providing means for absorbing the excessive energy of such discharges without adversely affecting the normal operation of the electronic track circuit.

Another object of this invention is to provide a means for protecting transistors or other low voltage electronic apparatus, which is electrically coupled to a pair of track rails, from lightning disturbances or other external voltage surges by absorbing any externally applied energy in excess of the operating potential of the apparatus.

Other objects, purposes, and characteristic features of the present invention will be in part obvious from the accompanying drawing and in part pointed out as the description of the invention progresses.

In describing the invention in detail, reference will be made to the accompanying drawings in which distinctive reference characters have been employed to designate the different parts of the organization, and in which:

The single figure of the drawing shows an electronic track circuit superimposed upon a conventional direct current track circuit for a railroad, with suitable associated lightning protective means as provided in accordance with the present invention.

To simplify the illustration and facilitate in the explanation, the various parts and circuits constituting the embodiment of this invention have been shown diagrammatically, and certain conventional illustrations have been used to make it easy to understand the principles and manner in operation rather than to illustrate the specific construction and arrangements of parts that would be used in practice. The various relays and their contacts are shown in a conventional manner.

The general organization shows a stretch of track including track rails 5, which is divided into the usual direct current track circuit by insulated track joints which includes a track relay T and a track battery B. A signal S governs traffic over this track section and switch points SW provide for the movement of traffic over the main track or onto a turnout track in the usual way. Associated with this track switch SW is a switch lock SL which will permit movement of the switch points either manually or by power only under the proper conditions of release which requires the energization of a switch lock magnet in the usual way.

For the purpose of the present disclosure the electronic track circuit is shown superimposed upon the direct current track circuit and its frequency and energy level are so selected as to be operative over only a limited portion of the track circuit adjacent the track switch SW. This electronic track circuit is shown as comprising in general a transmitter 9 and a receiver 10 which is connected to the track rails 5 through wires 6 and 7. These wires 6 and 7 go to a terminal board and have connected thereto suitable lightning arrestors 32, 33 and 34 as shown in the drawings, which lightning arrestors may be of any suitable type such as is shown, for example, in the U.S. Patent No. 2,297,323, dated Sept. 29, 1942.

In this connection, it is understood that the two track rails 5 are mounted upon suitable supporting ties which only partially insulate them from the ground. This is because the track ballast is around the ties and sometimes contacting the rails which results in an interrail ballast resistance which may vary between two ohms and infinity per thousand feet of track depending upon weather conditions. In view of this partial insulation between the rails and between the rails and ground it is readily apparent that static discharges and lightning discharges may make one rail of higher potential than the other. For this reason the lightning arrestor or discharge path between rails is provided by the arrestor 33, and in addition, both rails are provided with direct discharge paths to ground through the arrestor units 32 and 34.

The lead wires 6 and 7 are connected to one terminal of the transformers T2 and T3 with an intervening capacitor 8 between the other terminal of these transformers. This capacitor 8 provides direct current isolation between the two rails 5 and also acts to tune the electronic track circuit when the track section is occupied by a train within a limited distance of its connection to the track rails 5. It is noted that the location of this capacitor between the windings of the transformers T2 and T3 protects it from heavy lightning discharges.

Due to the fact that any static discharge occurring between the track rails will directly affect the electronic circuit, the arrestor or equalizer 33 will break-down to form an equalizing conductive path at a relatively low potential, as for example, two hundred twenty-five to two hundred seventy-five volts. The arrestors 32 and 34 situated between the rails and ground can break-down at a relatively high potential, as for example, one thousand volts.

The general organization of a transmitter and a receiver for the control of the related signals and the switch lock SL has been shown in the prior application of Auer et al. Ser. No. 538,552, filed October 5, 1955 and no claim is intended to be made herein to any subject matter common with such prior application. For this reason, the receiver and its connecting control circuits have been shown merely in block form and greatly abbreviated in this disclosure. Since the receiver 10 does not employ electronic apparatus as more fully shown in such prior application, it is not vulnerable to the relatively low voltage surges which adversely affect the transistors employed in the transmitter.

Because the present invention relates more particularly to an organization of apparatus to protect the transistorized transmitter, the circuits for the transmitter 9 have been shown in detail. In general, this transmitter 9 includes an oscillator and a push-pull amplifier which amplifies the output of the oscillator to provide an output of desired energy level to be supplied to the track rails through the inductive coupling of transformer T2.

As illustrated, the transmitter comprises an oscillator that includes the transistor 11. The collector of this transistor is connected through current limiting resistor 12 to the negative terminal of a battery 13, which for example, may be ten volts. The resistor 12 is bypassed by the capacitor 14 for the range of frequencies generated by this oscillator, which range may be in the order of 10 kilocycles. The base of transistor 11 is connected through inductor 15 to the junction of voltage dividing resistors 16 and 17 which provide the proper operating bias for the base of transistor 11. Inductor 15 is shunted by the series-connected capacitors 18 and 19 and provide a parallel tuned circuit that is resonant to substantially the desired output frequency of the transmitter. A circuit path is provided from the emitter through resistor 20 to the junction of capacitors 18 and 19 for the purpose of supplying the required positive feedback to sustain oscillation. The alternating emitter current resulting from these oscillations passes through the primary winding 21 of a transformer T1.

A push-pull parallel output stage is provided for amplifying the oscillations, and this output stage includes the transistors 22—25. The upper terminal of the secondary winding of transformer T1 is connected to the bases of the two transistors 22 and 23 while the lower terminal of this same secondary winding is connected to the bases of the transistors 24 and 25. The emitter of each of these transistors 24—25 is connected through a resistor such as resistor 26 associated with transistor 22 to a common wire 27 which is then connected over lead 28 to the mid-tap of the secondary winding 29 of transformer T1.

The collectors of the transistors 22 and 23 are both connected to the upper terminal of the primary winding 30 of transformer T2. The collectors of the transistors 24 and 25 are similarly connected to the lower terminal of this same winding. The mid-tap of this primary winding 30 is connected over wire 31 to the negative terminal of battery 13.

A capacitor 36, having a positive and negative terminal, is inserted in the circuit. Although various types of capacitors may be used in this invention as long as they are large enough to absorb any excessive surge or static discharge and also have internal leakage qualities so that any excessive charge may be dissipated. For example, it has been found that an electrolytic capacitor rate for fifty microfarads at fifty volts is suitable under one set of conditions.

The positive side of the capacitor 36 is connected to the positive side of the battery 13 at junction 35; and the negative side of the capacitor 36 is connected to the output wire 41, which leads from the collector electrodes of transistors 22 and 23 to the upper end of the primary winding of transformer T2 to the negative side of battery 13 through the mid-tap 30 of transformer T2 and wire 31. The negative side of the capacitor 36 is also connected to the output wire 42 leading from the collector electrodes of the transistors 24 and 25, the lower terminal of the primary winding of transformer T2 to the negative side of battery 13, through the mid-tap of winding 30 over line wire 31.

A bridge circuit generally designated as 45 and comprising diodes 37, 38, 39, and 40 is connected across the output wires 41 and 42 leading from the collector electrodes of the transistors 22—25 to the upper and lower terminals respectively of the primary winding of transformer T2.

Although various types of rectifying means may be used, it has been found advantageous to employ diodes of the germanium type, having low forward resistance characteristics and sufficiently high reverse resistance characteristics.

A diode 38 is inserted in the bridge circuit 45 between the negative side of the capacitor 36 and the line wire 41 and has its low resistance side facing the capacitor 36. A diode 39 is inserted in the bridge circuit 45 between the negative side of the capacitor 36 and the line wire 42, and has its low resistance side facing the capacitor 36. A diode 37 is inserted in the bridge 45 between junction 44 and line wire 41, and has its high resistance side facing the positive side of capacitor 36.

A lightning arrestor 32 is connected between the ground and the wire 6, which leads from a track rail to the secondary winding of transformer T2. Lightning arrestor 34 is connected between the ground and wire 7, which leads from a track rail to the primary winding of transformer T3. A lightning arrestor or equalizer 33 is connected across wire 6 and 7.

A diode 43 is shown as being inserted in the wire 31 which leads from the mid-tap 30 of transformer T2 to the negative side of battery 13 at a point between a junction 46 and the negative side of battery 13. This diode serves to protect the transmitter and the transistors therein in the event that one should inadvertently connect battery 13 in reverse polarity.

When the transmitter 9 is energized, an amplified alternating current of a selected frequency is transmitted to output transformer T2 over the output collector wires 41 and 42; and for example assuming battery 13 to be ten volts direct current, the output voltage across wires 41 and 42 is twenty volts alternating current. The diodes 37, 38, 39, and 40 in the bridge circuit 45 rectify and conduct current between wires 41 and 42 respectively until the capacitor is charged to the peak output voltage of the amplifier. The time constant in initially charging the capacitor is negligible because the resistance factor is very low. When the capacitor is fully charged, the diodes cease to conduct except for replacing any charge loss due to internal leakage. In this connection, it should be noted that the capacitor 36 is connected from the positive terminal of battery 13, through diodes 38 and 39 in multiple, through the mid-tap of transformer T2, over wire 31, and diode 43 to the negative terminal of battery 13.

Therefore, it is clearly apparent that because of the assembled relationship of the capacitor 36 with respect to diodes 37—40 in bridge circuit 45, the output of the amplifier is not effected by this protective circuit during normal operation.

Without the benefit of this invention, a static discharge or surge having a potential which is insufficient to actuate the arrestors 32, 33, or 34, but having a potential in excess of the output voltage of the amplifier, will readily be passed by the transformer and applied across the collector electrodes of transistors 22—25, either causing them to break down or melt, or at the very least effect an undue strain which tends to shorten their life.

With the benefit of this invention a positive excess potential on wire 41 will conduct through diode 37 into capacitor 36, through diode 39 to wire 42. It is noted that the connection between junction 35 and 44 provides a direct connection to the positive side of battery 13. This means that diode 37 provides a direct path for an excess potential thereby keeping it away from the collector and emitter elements of transistors 22 and 23.

Similarly, positive excess potential on wire 42 will conduct through diode 40, into capacitor 36 and through diode 38 to wire 41. In this respect it is noted that the aforementioned connection between joint 35 and 44 which provides a direct connection to the positive side of battery 13 forms a direct path through diode 40 and keeps it away from the collector and emitter elements of transistors 24 and 25.

The excessive energy which accompanies the static discharge is absorbed by the capacitor 36 and will gradually be dissipated due to the internal leakage qualities of the capacitors and the internal leakage of the diodes, which leakage qualities are particularly characteristic of electrolytic capacitors and germanium diodes. It is well understood that static discharges are oscillating so that these two absorbing paths are effective alternately for a static discharge but since such static discharges are rapidly attenuated, the capacitor 36 is capable of absorbing all the energy from such discharges.

In summary, it is apparent that there is a highly conductive path for static discharges between the output wires of the amplifying portion of the transmitter together with a means for absorbing the excess energy caused by such abnormal potentials between the output wires. This is accomplished by providing bridge connected diodes with a capacitor across the bridge which organization is so connected across the output wires and the emitter and collector elements of the transistors that for each half-cycle of static discharge one diode is effective to bypass the emitter collector elements of one pair of transistors and the capacitor absorbs the energy across corresponding elements of the other pair of transistors.

On the other hand, the bridge including four diodes is provided so that the capacitor is charged by the battery source and by the output voltages of the push-pull transistor amplifier. In this way the capacitor is prevented from being a load on the output of the amplifier, but allows its normal charge to establish a potential across the output wires equal to the peak voltages of the output frequency. In this way the capacitor stands ready to absorb and dissipate excess energy by external potentials to maintain the normal potential across the output wires of the amplifier and thereby protect the transistor amplifier.

With this organization adequate protection is provided for the transistor push-pull amplifier against any abnormal potentials rising above the normal output voltages, since the organization for absorbing excess energy is effective between the normal output voltage and the potential at which protection is provided by the low voltage lightning arrestor connected between the wires leading to the track rails.

Having thus described the structure and an organization for the protection of low voltage electronic apparatus from lightning discharges and other external voltage surges in a preferred form embodying the present invention, it is desired to be understood that this form is selected to facilitate in the disclosure of the invention rather than to limit the form which it may assume; and, it is to be further understood that various modifications, adaptations, and alterations may be applied to the specific forms shown to meet the requirements of practice, without in any manner departing from the spirit or scope of the present invention.

What I claim is:

1. In an electronic circuit organization effective to generate an alternating current of a selected frequency at its output terminals, a transformer having a primary winding connected across said output terminals, circuit means including a rectifying bridge having its input terminals connected parallel to said primary winding across said output terminals, a capacitor connected across the output terminals of said rectifying bridge, said rectifying bridge including diodes having low forward resistance characteristics for conducting the energy of a transient voltage surge to said capacitor, said capacitor having internal leakage characteristics for dissipating said transient energy voltage surge.

2. In an electronic circuit organization effective to generate an alternating current of a selected frequency at its output terminals, a load connected across said output terminals, a rectifying bridge having input and output terminals, circuit means for connecting the input terminals of said rectifying bridge across the output terminals of said electronic circuit organization and parallel to said load, a capacitor connected across the output terminal of the rectifying bridge, said rectifying bridge including diodes having low forward resistance characteristics for conducting the energy of a transient voltage surge to the capacitor and having high reverse resistance characteristics to permit the gradual dissipation of the energy of said transient surges which transient surges are absorbed by said capacitor.

3. In a railway signalling system, a pair of track rails, a transistorized transmitter for generating an alternating current signal of a selected frequency, an output transformer having primary and secondary windings, first circuit means for connecting said primary winding of said output transformer to said transistorized transmitter and connecting said secondary winding of said transformer to said track rails, a second circuit means including a rectifying bridge with a capacitor across its output terminals, said second circuit means being connected across said primary winding for absorbing any static discharges that may be present across said primary winding due to static discharges received by said track rails.

4. In a railway signalling system, a pair of track rails, a transistorized transmitter for generating an alternating current signal of a selected frequency at its output terminal, said output terminal being inductively coupled to said track rails, a lightning arrestor connected across said inductive coupling to said track rails, a rectifying bridge connected across said output terminals, a capacitor having internal leakage qualities connected across the output of said rectifying bridge, said rectifying bridge including diodes for charging the capacitor to the peak output voltage of the said transmitter, whereby said lightning arrestor provides an equalizing path between said rails for relatively high voltage static discharges and whereby said capacitor absorbs the energy for relatively low voltage static discharges.

5. In a railway signalling system, an organization for lightning protection comprising a pair of track rails, leads extending from said rails to said railway signalling equipment, a first lightning arrestor connected between one of said leads and the ground, a second lightning arrestor connected between the other of said leads and the ground, a third lightning arrestor connected between the said leads, a rectifying bridge connected across said leads, a capacitor connected across the output terminal of said rectifying bridge, said rectifying bridge acting to charge said capacitor by the energy from said static discharges and also acting by its inherent leakage characteristics to gradually dissipate said static discharges, whereby said signalling apparatus is protected from static discharges of low and high potentials.

6. In an electronic transmitter for transmitting signals of a selected frequency from its output terminals comprising a push-pull amplifier employing transistor units having input and output terminals, a direct current source for biasing the elements of said transistors, a rectifying bridge having input and output terminals, circuit means for connecting the input terminals of the rectifying bridge across the output terminals of said transistors, a capacitor having a positive and negative terminal connected across the output terminals of said rectifying bridge, said capacitor having its positive side connected to the positive side of said direct current biasing source.

7. In a track circuit organization for railway signaling systems, a pair of track rails, an electronic transmitter comprising a push-pull amplifier employing transistors having their collector terminals connected to the output terminals of said amplifier, a battery for biasing the transistor elements of said amplifier, a transformer having a primary and secondary winding, circuit means to connect the output terminals of said amplifier to the primary winding of said transformer, a second circuit means to connect the secondary winding of said transformer to said track rails, a first lightning arrestor connected between one side of said second circuit means and ground, a second lightning arrestor connected between the other side of said second circuit means and ground, a third lightning arrestor connected across said second circuit means, a rectifying bridge connected across said first circuit means, said rectifying bridge including diodes having low forward resistance characteristics and high reverse resistance characteristics, a capacitor connected across the output of said rectifying bridge, said capacitor also having its positive side connected to the positive terminal of said direct current source, said battery having its negative terminal connected to a mid-tap of said transformer.

References Cited in the file of this patent

UNITED STATES PATENTS

| | | |
|---|---|---|
| 2,538,177 | Vigren | June 16, 1951 |
| 2,748,274 | Pearlman | May 29, 1956 |